United States Patent
Hanumantha et al.

(10) Patent No.: US 10,920,136 B2
(45) Date of Patent: Feb. 16, 2021

(54) PROCESSES FOR SYNTHESIZING RED-EMITTING PHOSPHORS AND RELATED RED-EMITTING PHOSPHORS

(71) Applicant: Current Lighting Solutions, LLC, East Cleveland, OH (US)

(72) Inventors: Ravikumar Hanumantha, Westborough, MA (US); Prasanth Kumar Nammalwar, Karnataka (IN); Digamber Gurudas Porob, Karnataka (IN)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 322 days.

(21) Appl. No.: 15/768,562

(22) PCT Filed: Oct. 18, 2016

(86) PCT No.: PCT/US2016/057504
§ 371 (c)(1),
(2) Date: Apr. 16, 2018

(87) PCT Pub. No.: WO2017/091303
PCT Pub. Date: Jun. 1, 2017

(65) Prior Publication Data
US 2018/0312751 A1 Nov. 1, 2018

(30) Foreign Application Priority Data
Nov. 26, 2015 (IN) .......................... 6365/CHE/2015

(51) Int. Cl.
*C09K 11/61* (2006.01)
(52) U.S. Cl.
CPC .................................. *C09K 11/616* (2013.01)
(58) Field of Classification Search
CPC ................................................... C09K 11/616
See application file for complete search history.

(56) References Cited

U.S. PATENT DOCUMENTS

| 4,263,011 | A | 4/1981 | Huguenard et al. |
| 7,497,973 | B2 | 3/2009 | Radkov et al. |
| 7,648,649 | B2 | 1/2010 | Radkov et al. |
| 8,057,706 | B1 | 11/2011 | Setlur et al. |
| 8,252,613 | B1 | 8/2012 | Lyons et al. |
| 8,491,816 | B2 * | 7/2013 | Hong .................. C09K 11/675 252/301.4 H |
| 9,657,221 | B2 * | 5/2017 | Tsumori ................. F21V 3/04 |
| 9,982,189 | B2 * | 5/2018 | Tsumori ................. C09K 11/02 |
| 10,294,418 | B2 * | 5/2019 | Kaneyoshi ........... C01G 19/006 |
| 2003/0005552 | A1 | 1/2003 | Matsumoto |
| 2010/0142189 | A1 | 6/2010 | Hong et al. |
| 2012/0256125 | A1 | 10/2012 | Kaneyoshi et al. |
| 2015/0184067 | A1 | 7/2015 | Kajikawa et al. |
| 2015/0291878 | A1 | 10/2015 | Wakui et al. |
| 2015/0322338 | A1 | 11/2015 | Yoshida |

FOREIGN PATENT DOCUMENTS

| CN | 103400926 A | 11/2013 |
| CN | 105038774 A | 11/2015 |
| CN | 105038776 A | 11/2015 |
| EP | 2508586 A2 | 10/2012 |
| JP | S53-88664 A | 8/1978 |
| JP | 2002-274844 A | 9/2002 |
| JP | 2010-209311 A | 9/2010 |
| JP | 2015-143318 A | 8/2015 |
| WO | 2007100824 A2 | 9/2007 |
| WO | WO 2014/104155 * | 3/2014 |
| WO | WO 2014/104147 * | 7/2014 |
| WO | 2014152787 A1 | 9/2014 |
| WO | 2015089345 A1 | 6/2015 |
| WO | 2015115195 A1 | 8/2015 |
| WO | WO 2015/115195 * | 8/2015 |
| WO | 2015129116 A1 | 9/2015 |
| WO | 2015191943 A1 | 12/2015 |

OTHER PUBLICATIONS

Office Action Issued in connection with corresponding Taiwan Application No. 105137704 dated Mar. 24, 2020.
Office Action Issued in connection with corresponding Chinese Application No. 201680068997.1 dated May 29, 2020.
International Search Report and Written Opinion issued in connection with corresponding PCT Application No. PCT/US2016/057504 dated Feb. 10, 2017.
First Examination Report issued in connection with corresponding in Application No. 6365/CHE/2015 dated Apr. 13, 2018.

(Continued)

*Primary Examiner* — C Melissa Koslow
(74) *Attorney, Agent, or Firm* — Buckley, Maschoff & Talwalkar LLC

(57) ABSTRACT

A process for synthesizing a manganese doped phosphor of formula I: $A_x[MF_y]$:$Mn^{4+}$ is presented. The process includes contacting a first solution with a second solution and a third solution in the presence of a plurality of inert particles. The first solution and the second solution include a composition of formula II: $A_x[MnF_y]$. The third solution includes a source of M, where A is Li, Na, K, Rb, Cs, or combinations thereof; M is Si, Ge, Sn, Ti, Zr, Al, Ga, In, Sc, Hf, Y, La, Nb, Ta, Bi, Gd, or combinations thereof; x is an absolute value of a charge of the $[MF_y]$ ion; and y is 5, 6 or 7.

18 Claims, 1 Drawing Sheet

(56) References Cited

OTHER PUBLICATIONS

Figure 1:
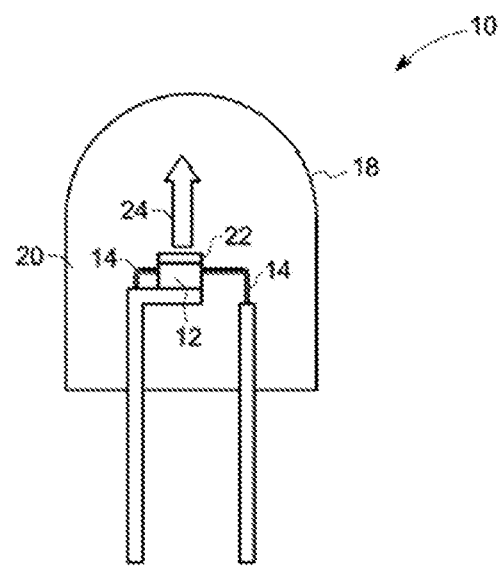

International Preliminary Report on Patentability issued in connection with corresponding PCT Application No. PCT/US2016/057504 dated May 29, 2018.
First Office Action which was issued in connection with corresponding JP Application No. 2018-526805 dated Jul. 29, 2020.

* cited by examiner

PROCESSES FOR SYNTHESIZING RED-EMITTING PHOSPHORS AND RELATED RED-EMITTING PHOSPHORS

TECHNICAL FIELD

The disclosure relates generally to red-emitting phosphors. More particularly, the disclosure relates to processes for synthesizing manganese doped red-emitting phosphors.

BACKGROUND

Red-emitting phosphors based on complex fluoride materials doped (or activated) with manganese ($Mn^{4+}$), such as those described in U.S. Pat. Nos. 8,057,706, 7,497,973, and 7,648,649, can be utilized in combination with yellow/green emitting phosphors such as YAG:Ce or other garnet compositions to achieve warm white light (CCTs<5000 K on the blackbody locus, color rendering index (CRI)>80) from a blue light emitting diode (LED). These red-emitting phosphors absorb blue light, and efficiently emit between about 610-635 nanometers with little deep red emission. Therefore, luminous efficacy of these red-emitting phosphors is maximized compared to other red-emitting phosphors that have significant emission in a deeper red region where eye sensitivity is poor.

Various processes for synthesizing the manganese ($Mn^{4+}$) doped complex fluoride phosphors are known, for example as described in US20120256125, WO2007/100824, US20100142189 and EP2508586. While the efficacy and CRI of lighting systems using manganese doped complex fluoride phosphors can be quite high, the potential limitations may be color instability and non-uniformity due to their susceptibility to degradation under high temperature and humidity (HTHH) conditions, and particle size distribution. It may be possible to reduce the color instability issue using post-synthesis processing steps, as described in U.S. Pat. No. 8,252,613. However, further improvements in color stability and uniformity of the lighting systems using these manganese doped complex fluoride phosphors may be needed.

Alternative processes for synthesizing manganese doped red-emitting phosphors, which can provide advantages over existing processes, such as improved color stability and uniformity, and lower cost for manufacturing, are desirable.

BRIEF DESCRIPTION

One aspect of the specification presents a process for synthesizing a manganese doped phosphor of formula I: $A_x[MF_y]:Mn^{4+}$, where A is Li, Na, K, Rb, Cs, or combinations thereof; M is Si, Ge, Sn, Ti, Zr, Al, Ga, In, Sc, Hf, Y, La, Nb, Ta, Bi, Gd, or combinations thereof; x is an absolute value of a charge of the $[MF_y]$ ion; and y is 5, 6 or 7. The process includes contacting a first solution with a second solution and a third solution in the presence of a plurality of inert particles. The first solution and the second solution include a composition of formula II: $A_x[MnF_y]$. The third solution includes a source of M.

Another aspect of the specification relates to a manganese doped phosphor of formula I that is synthesized by the process. In some aspects, a lighting apparatus that includes the manganese doped phosphor of formula (I) is provided.

In one aspect of the specification, a process for synthesizing a manganese doped phosphor of formula $K_2[SiF_6]:Mn^{4+}$ is provided. The process includes contacting a first solution with a second solution and a third solution in the presence of a plurality of inert particles. The first solution includes a first portion of a composition of formula $K_2[MnF_6]$ and a source of K. The second solution includes a second portion of the composition of formula $K_2[MnF_6]$. The third solution includes hexafluorosilicic acid. At least one of the first solution, the second solution, and the third solution further includes aqueous hydrofluoric acid.

DRAWINGS

Figure 2:
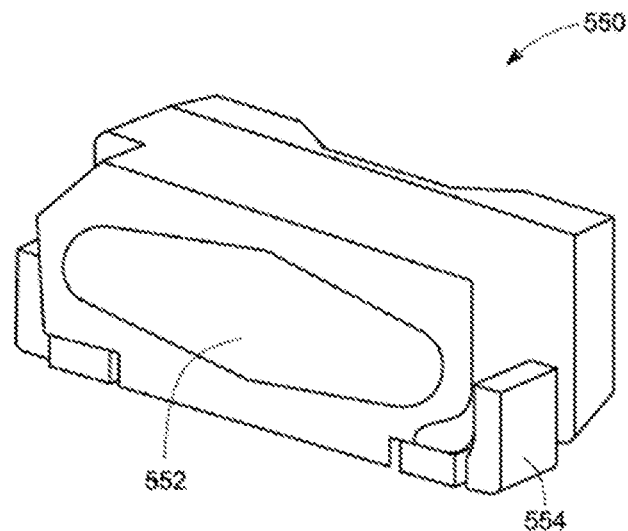

These and other features, aspects, and advantages of the present disclosure will become better understood when the following detailed description is read with reference to the accompanying drawings, wherein:

FIG. 1 is a schematic cross-sectional view of a lighting apparatus, in accordance with one embodiment of the invention; and FIG. 2 is a schematic perspective view of a surface-mounted device (SMD), in accordance with one embodiment of the invention.

DETAILED DESCRIPTION

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

Unless defined otherwise, technical and scientific terms used herein have the same meaning as is commonly understood by one of skill in the art to which this invention belongs. The terms "comprising," "including," and "having" are intended to be inclusive, and mean that there may be additional elements other than the listed elements. The terms "first", "second", and the like, as used herein do not denote any order, quantity, or importance, but rather are used to distinguish one element from another.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, or 20 to 80, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

As used herein, the terms "phosphor", "phosphor composition", or "phosphor material" may be used to denote both a single phosphor composition as well as blends of two or more phosphors. As used herein, the terms "lamp", "lighting apparatus", or "lighting system" refer to any source of visible and ultraviolet light, which can be generated by at least one light emitting element producing a light emission when energized, for example, a phosphor material or a light emitting diode.

Some embodiments provide a process for synthesizing manganese doped phosphor of formula I: $A_x[MF_y]:Mn^{4+}$. The process includes contacting a first solution with a second solution and a third solution in the presence of a plurality of inert particles. The first solution and the second solution include a composition of formula II: $A_x[MnF_y]$. The third solution includes a source of M.

The term "manganese doped phosphor of formula I" may also be referred to as "$Mn^{4+}$ doped phosphor of formula I" or "phosphor of formula I", and these terms may be used interchangeably.

Both, the manganese doped phosphor of formula I and the composition of formula II, are complex fluorides. More specifically, the manganese doped phosphor of formula I is a manganese ($Mn^{4+}$) doped complex fluoride. In the context of the present disclosure, the terms "complex fluoride" and "complex fluoride phosphor" refer to a coordination compound, having a host lattice containing one coordination center (at least M or manganese), surrounded by fluoride ions acting as ligands, and charge-compensated by counter ions (A) as necessary. For example, in $K_2[SiF_6]$, the coordination center is Si and the counter ion is K. Complex fluorides are occasionally written down as a combination of binary fluorides but such a representation does not indicate the coordination number for the ligands around the coordination center. The square brackets (occasionally omitted for simplicity) indicate that the complex ion they encompass is a new chemical species, different from the simple fluoride ion.

The counter ion A in formula I and formula II, is an alkali metal. In some embodiments, A includes Li, Na, K, Rb, Cs, or combinations thereof, and y is 6. In certain embodiments, A is Na, K, Rb, or combinations thereof. The coordination center M in formula I is an element selected from the group consisting of Si, Ge, Ti, Zr, Hf, Sn, Al, Ga, In, Sc, Y, Bi, La, Gd, Nb, Ta, and combinations thereof. In certain embodiments, M is a tetravalent element. In these embodiments, M is Si, Ge, Ti, or combinations thereof.

The composition of formula II may be a manganese compound that directly provides tetravalent manganese ($Mn^{4+}$) when combined with aqueous hydrofluoric acid. Suitable examples of the compositions of formula II include $K_2MnF_6$ and $Na_2MnF_6$. In certain embodiments, the composition of formula II is $K_2MnF_6$.

Examples of manganese doped phosphors of formula I include $K_2[SiF_6]:Mn^{4+}$, $K_2[TiF_6]:Mn^{4+}$, $K_2[SnF_6]:Mn^{4+}$, $Cs_2[TiF_6]:Mn^{4+}$, $Rb_2[TiF_6]:Mn^{4+}$, $Cs_2[SiF_6]:Mn^{4+}$, $Rb_2[SiF_6]:Mn^{4+}$, $Na_2[TiF_6]:Mn^{4+}$, $Na_2[ZrF_6]:Mn^{4+}$, $K_3[ZrF_7]:Mn^{4+}$, $K_3[BiF_7]:Mn^{4+}$, $K_3[YF_7]:Mn^{4+}$, $K_3[LaF_7]:Mn^{4+}$, $K_3[GdF_7]:Mn^{4+}$, $K_3[NbF_7]:Mn^{4+}$, $K_3[TaF_7]:Mn^{4+}$. In certain embodiments, the manganese doped phosphor of formula I is $K_2SiF_6:Mn^{4+}$.

In the manganese doped phosphor of formula I, for example Me doped complex fluoride phosphor such as $K_2SiF_6:Mn^{4+}$, a doped element that is, manganese (Mn) acts as an additional coordination center, substituting a part of the coordination center, for example, Si. The doped element 'Mn' is referred to as a 'dopant' or an 'activator.' The terms "doped ion" or "activator ion", as used herein, refers to an ion (for example $Mn^{4+}$) doped in a complex fluoride that forms luminescent center and is responsible for the luminescence of the phosphor of formula I. The host lattice (including the counter ions) may further modify the excitation and emission properties of the activator ion.

In some embodiments, the amount of manganese in the manganese doped phosphor of formula I ranges from about 0.3 weight percent (wt %) to about 2.5 wt %, (from about 1.2 mole percent (mol %) to about 10 mol %), based on total weight of phosphor. In some embodiments, the amount of manganese ranges from about 0.50 wt % to about 0.85 wt % (from about 2 mol % to about 3.4 mol %), and in certain embodiments, from about 0.65 wt % to about 0.75 wt % (from about 2.6 mol % to about 3 mol %). In some other embodiments, the amount of manganese ranges from about 0.75 wt %-2.5 wt % (about 3 mol % to about 10 mol %). In some embodiments, the amount of manganese ranges from about 0.9 wt % to 1.5 wt % (from about 3.5 mol % to about 6 mol %), and in certain embodiments, from about 0.9 wt % to about 1.4 wt % (about 3.0 mol % to about 5.5 mol %).

As noted, the third solution includes a source of M. The source of M may be a compound that is soluble in hydrofluoric acid. As described previously, in some embodiments, the element M is Si, Ge, Ti or combinations thereof. In certain embodiments, M is Si. Suitable examples of the sources of M include hexafluorosilicic acid ($H_2SiF_6$), alkali metal hexafluorosilicate ($A_2SiF_6$), silicon oxide ($SiO_2$), silicon chloride ($SiCl_4$), tetra acetyle orthosilicate $Si(OAc)_4$, tetraethyl orthosilicate ($Si(OEt)_4$) or combinations thereof. In certain embodiments, the source of M is hexafluorosilicic acid ($H_2SiF_6$). Other suitable examples of the sources of M include $TiO_2$, titanium hydrate, or combinations thereof.

In one embodiment, at least the first solution, the second solution or the third solution, includes aqueous hydrofluoric acid. In some embodiments, each of the first solution, the second solution and the third solution, includes aqueous hydrofluoric acid. That is, the first solution, the second solution and third solution may be prepared by mixing the corresponding constituents for example, the composition of formula II or the source of M in aqueous hydrofluoric acid. A concentration of aqueous hydrofluoric acid used in the first solution, the second solution and the third solution may range from about 20 weight percent (wt %) to about 70 wt %. In some embodiments, the first solution includes aqueous hydrofluoric acid having a concentration in a range from about 20 wt % to about 40 wt %. In some embodiments, the second solution includes aqueous hydrofluoric acid having a concentration in a range from about 40 wt % to about 70 wt %. In some embodiments, the third solution includes aqueous hydrofluoric acid having a concentration in a range from about 40 wt % to about 70 wt %. A small quantity of other acids may be included in at least the first solution, the second solution or the third solution if desired, such as hexafluorosilicic acid.

The amounts of the constituents in the corresponding first, second, and third solutions, may be suitable to carry out the desirable chemical reaction, and thereby form the manganese doped phosphor of formula I. In some embodiments, the first solution includes a first amount of the composition of formula II. In some embodiments, a ratio of amounts of the composition of formula II in the first solution and the second solution is in a range from about 40:60 to about 60:40.

In some embodiments, the first solution further includes a source of A. In certain embodiments, the source of A may provide $A^+$ ions. The source of A may be a salt, wherein the corresponding anion for $A^+$ ion is fluoride, chloride, acetate, chloride, oxalate, dihydrogen phosphate, or combinations thereof. In certain embodiments, the anion is fluoride. Suitable examples of the sources of A include KF, KHF$_2$, LiF, LiHF$_2$, NaF, NaHF$_2$, RbF, RbHF$_2$, CsF, CsHF$_2$, or combinations thereof. In certain embodiments, the anion is fluoride, and A includes K.

As used herein, the term "inert particles" refers to a plurality of particles including a material that is chemically stable in hydrofluoric acid. In some embodiments, the inert particles are chemically stable in the first solution and the combined solution up to an elevated temperature (for example, 100 degrees Celsius). Moreover, the material may have physical properties, for example, hardness and density, such that the inert particles are compatible in the first solution and the combined solution during the synthesis process. In some embodiments, the inert particles are able to maintain their shape and retain their surfaces without any deformation and erosion during the synthesis process, particularly during an agitated motion (for example, stirring of the solution), and do not contaminate the solutions or a reaction product. Further, in some embodiments, the material has a density such that the inert particles are suspended or float in a solution (for example, the first solution or the combined solution) during the synthesis process.

Non limiting examples of suitable materials for inert particles include low-density polyethylene (LDPE), high-density polyethylene (HDPE), polypropylene (PP), polypropylene copolymer (PPCO), polymethylpentene (PMP), fluorinated polyethylene (FLPE), fluorinated ethylene propylene (FEP), tetrafluoroethylene (TFE), cross-linked high density polyethylene (XLPE), polyfluoroalkoxy (PFA), ethylene-chlorotrifluoroethylene copolymer (ECTFE), ethylene-tetrafluoroethylene (ETFE), polycarbonate, rigid polyvinyl chloride (PVC), flexible polyvinyl chloride (PVC), polyvinylidene fluoride (PVDF), polysulfone (PSF), polystyrene (PS), styrene acrylonitrile (SAN), polyetherimide (PEI), or combinations thereof. In certain embodiments, the inert particles include polytetrafluoroethylene (Teflon™).

The plurality of inert particles may be characterized in a variety of shapes, sizes and geometries. The plurality of inert particles may have any shape including spherical, cuboidal, lenticular, flaky and other shapes. In some embodiments, a cross sectional geometry of the particles may be one or more of circular, ellipsoidal, triangular, rectangular, or polygonal. In certain embodiments, the plurality of inert particles may be substantially spherical in shape. In some other embodiments, the plurality of inert particles may include particles having one or more of the aforementioned shapes and/or geometries. In yet some other embodiments, the particles may be irregular in shape. In certain embodiments, the plurality of inert particles includes polytetrafluoroethylene (Teflon™) beads.

As noted, the process includes contacting the first solution with the second solution and the third solution in the presence of the plurality of inert particles. In some embodiments, the process further includes forming the first solution, the second solution and the third solution before contacting them. The first solution, the second solution and the third solution may be separately prepared by dissolving the corresponding constituents in aqueous hydrofluoric acid. Various details of the constituents (with respect to the materials and their amounts) for preparing the first solution, the second solution and the third solution are discussed previously.

In some embodiments, the process includes first disposing the plurality of inert particles in the first solution, and then contacting the first solution to the second solution and the third solution in the presence of the plurality of inert particles, to form a combined solution. In some embodiments, the contacting step includes adding the second solution and the third solution to the first solution in the presence of the plurality of inert particles. In some embodiments, the contacting step includes simultaneously adding the second solution and the third solution to the first solution.

In some embodiments, the contacting step is carried out for a period of time to substantially complete a chemical reaction. The chemical reaction may be carried out for a long period of time or short period of time, which may depend on several processing parameters, such as a rate of addition of the second solution and the third solution to the first solution, the quantities of constituents, an amount and size of the inert particles, and a speed of an agitation motion. A period of time in which a chemical reaction completes, may also be referred to as a reaction time. As the second solution and the third solution reacts with the first solution, a precipitate may start forming in the combined solution. The precipitate may include particles of manganese doped phosphor of formula I. As the chemical reaction proceeds, the process may include forming and growing the particles of the precipitate. In some embodiments, the chemical reaction is carried out for a reaction time in a range from about 5 minutes to about 10 hours. In certain embodiments, the reaction time is in a range from about 8 minutes to about 30 minutes. Furthermore, in some embodiments, the chemical reaction may be carried out at an elevated temperature, for example up to about 100 degrees Celsius. In certain embodiments, the chemical reaction is carried out at room temperature.

In some embodiments, during the step of contacting the first solution to the second solution and the third solution, the first solution (along with the plurality of inert particles) is subjected to an agitated motion. In some instances, the agiated motion refers to stirring of the first solution. In some embodiments, the process includes continuously subjecting the combined solution to the agitated motion for the entire reaction time. The agitated motion may enable the plurality of inert particles and the formed particles of the precipitate to continuously move within the combined solution.

Without being bound by any theory, it is believed that the plurality of inert particles in the combined solution during the formation and growth of the particles of the precipitate, may collide and break the larger particles (for example, >30 microns) of the precipitate (including the phosphor of formula I). This may result in reducing the particle size of the precipitate particles. Further, during the process, the agitated motion of the combined solution, ensures the continuous movement of the plurality of inert particles and the formed precipitate particles so that these particles may collide with each other.

Thus, the process of the present disclosure allows for control of the particle size of the resulting particles of the phosphor of formula I, while synthesizing them. The presence of the plurality of inert particles during the synthesis process, helps in controlling particle growth of the phosphor of formula I in situ, and enables to provide the particles size distribution of the resulting particles of the phosphor of formula I in a desired range. Moreover, the process advantageously reduces a total amount of the hydrofluoric acid used in the chemical reaction as compared to the other processes.

In some embodiments, the process further includes an ageing step after completion of the contacting step. The ageing step may include continuing to subject the combined solution to the agitated motion for a duration of time after completing the contacting step. The aging step may further allow for controlling of the particle size of the remaining large particles of the precipitate. Depending on several processing parameters, the ageing step may be performed for a suitable duration of time. In some embodiments, the ageing step is performed for a duration from about 1 minute to about 1 hour. In certain embodiments, the ageing step is performed for about 1 minute to about 15 minutes. After the completion of the ageing step, the combined solution includes an amount of the precipitate. In some embodiments, the precipitate includes a plurality of particles of manganese doped phosphor of formula I.

The process may further include filtering the combined solution to obtain the precipitate. In some embodiments, the filtering step further includes removing the plurality of inert particles from the precipitate. The process may further include washing the resulting precipitate followed by drying to obtain a plurality of manganese doped phosphor particles of formula I. In some embodiments, the process thereby includes forming a plurality of manganese doped phosphor particles of formula I. In some embodiments, the plurality of manganese doped phosphor particles of formula I is obtained in a powder form. The terms, "plurality of manganese doped phosphor particles of formula I" and "phosphor particles of formula I" may be used interchangeably throughout the specification.

The particle sizes of the resulting phosphor particles of formula I may depend on various process parameters, for example, one or more of the amount and size of the plurality of inert particles; and the stirring speed of the combined solution during the occurrence of the chemical reaction, and may be controlled by tailoring these parameters.

In some embodiments, the plurality of inert particles has an average particle size in a range from about 1 millimeter to about 10 millimeters. In certain embodiments, the plurality of inert particles has an average particle size in a range from about 5 millimeters to about 10 millimeters. In some embodiments, the plurality of inert particles may include a combination of different sizes of particles. A volume percentage of the plurality of inert particles in the combined solution may be in a range from about 5 percent to about 50 percent, based on a total volume of the first solution. In certain embodiments, the plurality of inert particles are present in a range from about 10 percent to about 30 percent, based on the total volume of the first solution. In some embodiments, an additional amount of inert particles can be added to the combined solution during the occurance of the chemical reaction. Moreover, the speed of stirring the combined solution may be selected such that the inert particle are suspended or float in the combined solution, which may depend on several processing parameters, specifically for example the amount and size of the inert particles. In some embodiments, the speed of stirring the combined solution may be in a range from about 100 rpm to about 500 rpm. In some embodiments, the speed of stirring may be in a range from about 200 rpm to about 300 rpm.

Moreover, in some embodiments, by controlling one or more of the process details such as the amount of hydrofluoric acid in the solutions, the amounts of the constituents in the first, second and third solutions, the temperature of the chemical reaction and the reaction time, the particle sizes of the resulting phosphor particles of formula I can be further tuned.

In some embodiments, the resulting phosphor particles of formula I have a fine particle size distribution having a D50 particle size less than about 35 microns. In some embodiments, the phosphor particles of formula I have a D50 particle size in a range from about 10 microns to about 30 microns. In some embodiments, the phosphor particles of formula I have a D50 particle size in a range from about 15 microns to about 25 microns. In some embodiments, the phosphor particles of formula I have a D90 particle size in a range from about 30 microns to about 50 microns. In some embodiments, a D10 particle size is in a range from about 10 microns to about 20 microns. As used herein, D values such as D90, D50 and D10 are generally used to represent particle size distribution. D90, D50 or D10 is defined as a size value corresponding to cumulative size distribution, respectively, at 90%, 50%, or 10%, which indicates that 90%, 50%, or 10% of particles of a sample are below the D90, D50, or D10 value.

The fine particle size distribution of the manganese doped phosphor of formula I may be advantageous for achieving desired performance improvements in a lighting apparatus. For example, the sedimentation rate (or settling rate) of the phosphor particles of formula I (as described herein) in an encapsulant material (for example, silicone) may be slower because of the reduced particle size than that of the large particles (D50>50 microns). By controlling the particle size and particle size distribution of the phosphor particles of formula I, the sedimentation rate of the phosphor particles of formula I can be tuned to at least match, be slower or be faster than other phosphors in a blend, and thus enables control over the separation of the phosphor of formula I from other phosphors. The separation of the phosphor of formula I from other phosphors may be beneficial to control the amount and the location (proximate or farther from an LED chip) of the phosphor particles of formula I in order to achieve a desired color point, and protect the phosphors of formula I from a damage caused by the excitation flux. Moreover, the fine particle size (as discussed above) may allow the use of simple deposition techniques, for example spray coating techniques.

After completion of the described synthesis process steps, the resulting phosphor particles of formula I may undergo a treatment process. In some embodiments, the resulting phosphor particles of formula I may be post-treated for enhancing performance and color stability of the phosphor of formula I as described in U.S. Pat. No. 8,252,613.

Some embodiments provide a process for synthesizing a manganese doped phosphor of formula $K_2[SiF_6]:Mn^{4+}$. The process includes contacting a first solution with a second solution and a third solution in the presence of a plurality of inert particles. The first solution includes a first portion of a composition of formula $K_2[MnF_6]$ and a source of K. The second solution includes a second portion of the composition of formula $K_2[MnF_6]$. The third solution includes hexafluorosilicic acid. At least one of the first solution, the second solution, and the third solution further includes aqueous hydrofluoric acid. The other process details are described hereinabove.

Some embodiments thus provide a manganese doped phosphor of formula I synthesized according to the process as described in the above embodiments. The process includes contacting the first solution with the second solution and the third solution in the presence of the plurality of inert particles. Various process details are described hereinabove.

Some embodiments are directed to a lighting apparatus that includes a phosphor composition radiationally coupled to a light source. The phosphor composition includes the manganese doped phosphor of formula I as disclosed in the above embodiments. In one embodiment, the light source can be a semiconductor radiation source, for example a light emitting diode (LED) or an organic light emitting device (OLED). Radiationally coupled means that radiation from the light source is transmitted to the phosphor composition, and the phosphor composition emits radiation of a different wavelength. A combination of the light from the light source and the light emitted from the phosphor composition may be used to produce a desired color emission or white light. For example, a light emitting LED device may be based on a blue emitting InGaN LED chip. The blue emitting LED chip may be coated with a phosphor composition to convert some of the blue radiation to a complementary color, e.g. a red emission, a green emission or a white emission.

Non-limiting examples of lighting apparatus or devices include devices for excitation by light-emitting diodes (LEDs) such as fluorescent lamps, cathode ray tubes, plasma display devices, liquid crystal displays (LCD's), UV excitation devices, such as in chromatic lamps, lamps for backlighting, liquid crystal displays (LCD), plasma screens, xenon excitation lamps, and UV excitation marking systems. The list of these devices is meant to be merely exemplary and not exhaustive.

FIG. 1 illustrates a lighting apparatus or lamp 10 according to some embodiments. The lamp 10 includes a light emitting diode (LED) chip 12, and leads 14 electrically attached to the LED chip. The leads 14 provide current to LED chip 12 and thus cause it to emit radiation. The LED chip 12 may be any semiconductor blue or ultraviolet light source, for example based on a nitride compound semiconductor of formula $In_iGa_jAl_kN$ (where $0 \leq i$; $0 \leq j$; $0 \leq k$ and $i+j+k=1$) having an emission wavelength greater than about 250 nm and less than about 550 nm. More particularly, the chip 12 may be a near-UV or blue emitting LED having a peak emission wavelength from about 300 nm to about 500 nm. Such LEDs are known in the art. In the lamp 10, a phosphor composition 22 (as described in the above embodiments) is disposed on a surface of the LED chip 12, and is radiationally coupled to the chip 12. The phosphor composition 22 can be deposited on the LED 12 by any appropriate method known in the art. The light emitted by the LED chip 12 mixes with the light emitted by the phosphor composition 22 to produce desired emission (indicated by arrow 24).

Although the general discussion of the exemplary structures of the lighting apparatus discussed herein are directed toward inorganic LED based light sources, it should be understood that the LED chip may be replaced by an organic light emissive structure or other radiation source, unless otherwise noted, and that any reference to an LED chip or semiconductor is merely representative of any appropriate radiation source.

With continued reference to FIG. 1, the LED chip 12 may be encapsulated within an envelope 18, which encloses the LED chip and an encapsulant material 20. The envelope 18 may be, for example, glass or plastic. The LED chip 12 may be enclosed by the encapsulant material 20. The encapsulant material 20 may be a low temperature glass, a thermoplastic or thermoset polymer, or a suitable resin known in the art, for example, a silicone or epoxy resin. In an alternative embodiment, the lamp 10 may only include the encapsulant material without an outer envelope 18.

Various structures of the lamp 10 are known in the art. For example, in some embodiments, the phosphor composition may be interspersed within the encapsulant material, instead of being disposed directly on the LED chip 12. In some other embodiments, the phosphor composition may be coated onto a surface of the envelope 18, instead of being formed over the LED chip 12. Moreover, in some embodiments, the lamp 10 may include a plurality of LED chips. These various structures discussed with respect to FIG. 1 may be combined, with the phosphor composition located in any two or all three locations or in any other suitable location, such as separately from the envelop or integrated into the LED. Further, different phosphor compositions may be used in different parts of the structure.

In any of the above structures, the LED based lighting apparatus 10 may also include a plurality of particles (not shown) to scatter or diffuse the emitted light. These scattering particles would generally be embedded in the encapsulant 20. The scattering particles may include, for example, particles made from $Al_2O_3$ (alumina) or $TiO_2$ (titania). The scattering particles may effectively scatter the light emitted from the LED chip 12, preferably with a negligible amount of absorption.

In some embodiments, the lighting apparatus can be a fluorescent lamp or a compact fluorescent lamp (CFL), in combination with a LED. For instance, a combination of a LED-generated light and a phosphor-generated light may be used to produce visible light having enhanced color contrast. In this instance, a LED can be mounted in the base of the fluorescent lamp, for example a CFL lamp. The LED can add or supplement light in selected wavelength regions of the visible spectrum (such as, a portion of blue region) to the light being generated by the phosphor composition coated on a glass envelope of the fluorescent lamp.

By use of the embodiments described in the present disclosure, the phosphor compositions described herein, lamps can be provided producing red light or white light having high luminosity, and high CRI values for a low range of color temperatures of interest (2500 K to 4000 K) for general illumination.

Another structure (particularly for backlight applications) is a surface mounted device ("SMD") type light emitting diode 550, e.g. as illustrated in FIG. 2. This SMD is a "side-emitting type" and has a light-emitting window 552 on a protruding portion of a light guiding member 554. An SMD package may include an LED chip as defined above, and the phosphor composition that is excited by the light emitted from the LED chip. Other backlight devices include, but are not limited to, TVs, computers, monitors, smartphones, tablet computers and other handheld devices that have a display including a semiconductor light source.

In addition to the manganese doped phosphor of formula I, the phosphor composition may include one or more additional phosphors. When the phosphor composition is used in a lighting apparatus in combination with a blue or near UV LED emitting radiation in the range of about 250 to 550 nm, the resultant light emitted by the lighting apparatus may be a white light. Additional phosphors such as green, blue, yellow, red, orange, or other color phosphors may be used in the phosphor composition (for example, a blend) to customize the white color of the resulting light and produce specific spectral power distributions.

Suitable additional phosphors for use in the phosphor composition include, but are not limited to: $((Sr_{1-z}(Ca, Ba, Mg, Zn)_z)_{1-(x+w)}(Li, Na, K, Rb)_wCe_x)_3(Al_{1-y}Si_y)O_{4+y+3(x-w)}F_{1-y-3(x-w)}$, $0<x\leq0.10$, $0\leq y\leq0.5$, $0\leq z\leq0.5$, $0\leq w\leq x$; $(Ca, Ce)_3Sc_2Si_3O_{12}$ (CaSiG); $(Sr,Ca,Ba)_3Al_{1-x}Si_xO_{4+x}F_{1-x}:Ce^{3+}$ (SASOF)); $(Ba,Sr,Ca)_5(PO_4)_3(Cl,F,Br,OH):Eu^{2+},Mn^{2+}$; $(Ba,Sr,Ca)BPO_5:Eu^{2+},Mn^{2+}$; $(Sr,Ca)_{10}(PO_4)_6*vB_2O_3:Eu^{2+}$ (wherein $0<v\leq1$); $Sr_2Si_3O_8*2SrCl_2:Eu^{2+}$; $(Ca,Sr,Ba)_3MgSi_2O_8:Eu^{2+},Mn^{2+}$; $BaAl_8O_{13}:Eu^{2+}$; $2SrO*0.84P_2O_5*0.16B_2O_3:Eu^{2+}$; $(Ba,Sr,Ca)MgAl_{10}O_{17}:Eu^{2+},Mn^{2+}$; $(Ba,Sr,Ca)Al_2O_4:Eu^{2+}$; $(Y,Gd,Lu,Sc,La)BO_3:Ce^{3+},Tb^{3+}$; $ZnS:Cu^+,Cl^-$; $ZnS:Cu^+,Al^{3+}$; $ZnS:Ag^+,Cl^-$; $ZnS:Ag^+,Al^{3+}$; $(Ba,Sr,Ca)_2Si_{1-\xi}O_{4-2\xi}:Eu^{2+}$ (wherein $-0.2\leq\xi\leq0.2$); $(Ba,Sr,Ca)_2(Mg,Zn)Si_2O_7:Eu^{2+}$; $(Sr,$ Ca,Ba)(Al,Ga,In)$_2$S$_4$:Eu$^{2+}$; (Y,Gd,Tb,La,Sm,Pr,Lu)$_3$(Al,Ga)$_{5-\alpha}$O$_{12-3/2\alpha}$:Ce$^{3+}$ (wherein 0≤α≤0.5); (Ca,Sr)$_8$(Mg,Zn)(SiO$_4$)$_4$Cl$_2$:Eu$^{2+}$,Mn$^{2+}$; Na$_2$Gd$_2$B$_2$O$_7$:Ce$^{3+}$,Tb$^{3+}$; (Sr,Ca,Ba,Mg,Zn)$_2$P$_2$O$_7$:Eu$^{2+}$,Mn$^{2+}$; (Gd,Y,Lu,La)$_2$O$_3$:Eu$^{3+}$,Bi$^{3+}$; (Gd,Y,Lu,La)$_2$O$_2$S:Eu$^{3+}$,Bi$^{3+}$; (Gd,Y,Lu,La)VO$_4$:Eu$^{3+}$,Bi$^{3+}$; (Ca,Sr)S:Eu$^{2+}$,Ce$^{3+}$; SrY$_2$S$_4$:Eu$^{2+}$; CaLa$_2$S$_4$:Ce$^{3+}$; (Ba,Sr,Ca)MgP$_2$O$_7$:Eu$^{2+}$,Mn$^{2+}$; (Y,Lu)$_2$WO$_6$:Eu$^{3+}$,Mo$^{6+}$; (Ba,Sr,Ca)$_\beta$Si$_\nu$N$_\mu$:Eu$^{2+}$ (wherein 2β+4γ=3μ); (Ba,Sr,Ca)$_2$Si$_{5-x}$Al$_x$N$_{8-x}$O$_x$:Eu$^{2+}$ (wherein 0≤x≤2); Ca$_3$(SiO$_4$)Cl$_2$:Eu$^{2+}$; (Lu,Sc,Y,Tb)$_{2-u-v}$Ce$_v$Ca$_{1+u}$Li$_w$Mg$_{2-w}$P$_w$(Si,Ge)$_{3-w}$O$_{12-u/2}$ (where 0.5≤u≤1, 0<v≤0.1, and 0≤w≤0.2); (Y,Lu,Gd)$_{2-\varphi}$Ca$_\varphi$Si$_4$N$_{6+\varphi}$C$_{1-\varphi}$:Ce$^{3+}$, (wherein 0≤φ≤0.5); (Lu,Ca,Li,Mg,Y), α-SiAlON doped with Eu$^{2+}$ and/or Ce$^{3+}$; (Ca,Sr,Ba)SiO$_2$N$_2$:Eu$^{2+}$,Ce$^{3+}$; β-SiAlON:Eu$^{2+}$, 3.5MgO*0.5MgF$_2$*GeO$_2$:Mn$^{4+}$; (Sr,Ca,Ba)AlSiN$_3$:Eu$^{2+}$; (Sr,Ca,Ba)$_3$SiO$_5$:Eu$^{2+}$; Ca$_{1-c-f}$Ce$_c$Eu$_f$Al$_{1+c}$Si$_{1-c}$N$_3$, (where 0≤c≤0.2, 0≤f≤0.2); Ca$_{1-h-r}$Ce$_h$Eu$_r$Al$_{1-h}$(Mg,Zn)$_h$SiN$_3$, (where 0≤h≤0.2, 0≤r≤0.2); Ca$_{1-2s-t}$Ce$_s$(Li,Na)$_s$Eu$_t$AlSiN$_3$, (where 0≤s≤0.2, 0≤f≤0.2, s+t>0); and Ca$_{1-o-\chi-\phi}$Ce$_o$(Li,Na)$_\chi$Eu$_\phi$Al$_{1+o-\chi}$Si$_{1-o+\chi}$N$_3$, (where 0≤o≤0.2, 0≤χ≤0.4, 0≤φ≤0.2).

Other additional materials suitable for use in phosphor composition include electroluminescent polymers such as polyfluorenes, preferably poly(9,9-dioctyl fluorene) and copolymers thereof, such as poly(9,9'-dioctylfluorene-co-bis-N,N'-(4-butylphenyl)diphenylamine) (F8-TFB); poly (vinylcarbazole) and polyphenylenevinylene and their derivatives. In addition, the phosphor composition may include a blue, yellow, orange, green or red phosphorescent dye or metal complex, or combinations thereof. Materials suitable for use as the phosphorescent dye include, but are not limited to, tris(1-phenylisoquinoline) iridium (III) (red dye), tris(2-phenylpyridine) iridium (green dye) and Iridium (III) bis(2-(4,6-difluorephenyl)pyridinato-N,C2) (blue dye). Commercially available fluorescent and phosphorescent metal complexes from ADS (American Dyes Source, Inc.) may also be used. ADS green dyes include ADS060GE, ADS061GE, ADS063GE, and ADS066GE, ADS078GE, and ADS090GE. ADS blue dyes include ADS064BE, ADS065BE, and ADS070BE. ADS red dyes include ADS067RE, ADS068RE, ADS069RE, ADS075RE, ADS076RE, ADS067RE, and ADS077RE.

The ratio of each of the individual phosphors in the blend may vary depending on the characteristics of the desired light output. The relative proportions of individual phosphors in various phosphor blends may be adjusted such that when their emissions are blended and employed in an LED lighting apparatus, there is produced visible light of predetermined x and y values on the CIE chromaticity diagram. As stated, a white light is preferably produced. This white light, for instance, may possess an x value in the range of about 0.20 to about 0.55, and a y value in the range of about 0.20 to about 0.55. As stated, however, the exact identity and amount of each phosphor in the phosphor composition can be varied according to the needs of the end user. For example, the composition can be used for LEDs intended for liquid crystal display (LCD) backlighting. In this application, the LED color point would be appropriately tuned based upon the desired white, red, green, and blue colors after passing through an LCD/color filter combination. The list of potential phosphors for blending given here is not meant to be exhaustive and the manganese doped phosphor of formula I can be blended with various phosphors with different emission to achieve desired spectral power distributions.

EXAMPLES

The example that follows is merely illustrative, and should not be construed to be any sort of limitation on the scope of the claimed invention.

Comparative Example 1: Phosphor Synthesis in the Absence of Inert Particles

A phosphor of formula I was prepared by carrying out a synthesis process without using Teflon™ beads. A first solution was prepared by dissolving 16.2 grams KHF$_2$ and 0.268 gram K$_2$MnF$_6$ in 130 milliliters (ml) HF (48%) (Semiconductor grade-LOBA Chemie) in a beaker. A second solution was prepared by dissolving 0.608 gram K$_2$MnF$_6$ in 42 ml HF (48%). A third solution was prepared by dissolving 30 ml H$_2$SiF$_6$ in 120 ml HF (40%) (Aldrich). While stirring the first solution in a beaker at a speed of 200 rpm, the second solution and the third solution were slowly added to the first solution for about 8 minutes until a precipitate was obtained. The stirring was continued for about 1-2 minutes. The precipitate was filtered followed by washing 3 times with acetone and acetic acid. This was followed by washing with water. The resulting product was finally dried in vacuum at about 100 degrees Celsius to obtain a powder of the phosphor.

Examples 1-7: Phosphor Synthesis in the Presence of Inert Particles

Examples 1-7 were prepared by carrying out a synthesis process using Teflon™ beads. A first solution, a second solution and a third solution were prepared in the similar manner as described in comparative example 1. Examples 1-7 were synthesized by the process as described in comparative example 1 except that Teflon™ beads of predetermined sizes and in predetermined amounts were disposed in the beaker with the first solution before adding the second and third solutions to the first solution. The sizes and amounts of Teflon™ beads used in examples 1-7 are given in Table 1.

The resulting phosphor powders formed in examples 1-7 were analyzed for their crystal structures using powder x-ray diffraction. The powders were identified to have a crystalline structure similar to K$_2$SiF$_6$, confirming the formation of a complex fluoride. Further, the emission spectra of the powders were measured using a spectrophotometer. The powders displayed red fluorescence when excited with UV or blue light, demonstrating the formation of manganese doped complex fluorides i.e., a phosphor of formula K$_2$SiF$_6$:Mn$^{4+}$. The phosphors of examples 1-7 were measured for quantum efficiency at excitation wavelength 450 nm by using a quantum efficiency measuring system. The quantum efficiency of the phosphors of examples 1-7 were measured in a range from about 80-90. Also, the yields of examples 1-7 were comparable to that of the comparative example 1.

The phosphors of examples 1-7 were then analyzed using particle size analyzer (Malvern). Table 1 further shows D10/D50/D90 particle sizes of the phosphors of comparative example 1 and examples 1-7. It can be easily observed that the phosphors of examples 1-7 include particles having D10/D50/D90 particle sizes much lower than that of comparative example 1.

TABLE 1

| Samples | Teflon™ beads Size (mm) | Amount (No. of beads) | Particle Size Distribution D10 (microns) | D50 (microns) | D90 (microns) |
|---|---|---|---|---|---|
| Comparative example 1 | — | — | 35.6 | 62.0 | 102.0 |
| Example 1 | 5 | 30 | 19.8 | 32.2 | 49.7 |
| Example 2 | 10 | 30 | 15.2 | 25.3 | 40.4 |
| Example 3 | 5 | 50 | 20.8 | 34.7 | 54.7 |
| Example 4 | 10 | 50 | 14.4 | 24.3 | 39.5 |
| Example 5 | 5 and 10 | 25 of each size | 17.4 | 26.9 | 40.7 |

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A process for synthesizing a manganese doped phosphor of formula I, $$A_x[MF_y]:Mn^{+4} \quad \text{I}$$

the process comprising:
contacting a first solution with a second solution and a third solution in the presence of a plurality of inert particles, wherein the first solution and the second solution comprise a composition of formula II: $Ax[MnF_y]$ and the third solution comprises a source of M,
wherein,
A is Li, Na, K, Rb, Cs, or combinations thereof;
M is Si, Ge, Sn, Ti, Zr, Al, Ga, In, Sc, Hf, Y, La, Nb, Ta, Bi, Gd, or combinations thereof;
x is an absolute value of a charge of the $[MF_y]$ ion; and
y is 5, 6 or 7.

2. The process according to claim 1, wherein the plurality of inert particles comprises polytetrafluoroethylene.

3. The process according to claim 1, wherein an average particle size of the plurality of inert particles is in a range from about 1 millimeter to about 10 millimeters.

4. The process according to claim 1, wherein a volume percentage of the plurality of inert particles in the first solution is in a range from about 5 percent to about 50 percent.

5. The process according to claim 1, wherein
A is Na, K, Rb, Cs, or combinations thereof;
M is Si, Ge, Ti, or combinations thereof; and
Y is 6.

6. The process according to claim 1, wherein at least one of the first solution, the second solution, and the third solution comprises hydrofluoric acid.

7. The process according to claim 1, wherein the source of M comprises hexafluorosilicic acid.

8. The process according to claim 1, wherein the first solution further comprises a source of A.

9. The process according to claim 8, wherein the source of A comprises potassium hydrogenfluoride ($KHF_2$), potassium fluoride (KF), or a combination thereof.

10. The process according to claim 1, wherein the composition of formula II is $K_2MnF_6$.

11. The process according to claim 1, wherein the manganese doped phosphor of formula I is $K_2SiF_6:Mn^{4+}$.

12. The process according to claim 1, wherein during the step of contacting the first solution with the second solution and the third solution, the first solution is subjected to an agitated motion.

13. The process according to claim 1, further comprising ageing a combined solution of the first solution, the second solution, and the third solution after the contacting step.

14. The process according to claim 1, wherein the process comprises forming a plurality of particles of the manganese doped phosphor of formula I, and the plurality of particles has a particle size distribution having a D50 value in a range from about 15 microns to about 25 microns.

15. A process for synthesizing a manganese doped phosphor of formula $K_2[SiF_6]:Mn^{4+}$, the process comprising:
contacting a first solution with a second solution and a third solution in the presence of a plurality of inert particles, wherein the first solution comprises a first portion of a composition of formula $K_2[MnF_6]$ and a source of K, the second solution comprises a second portion of the composition of formula $K_2[MnF_6]$, and the third solution comprises hexafluorosilicic acid, and wherein at least one of the first solution, the second solution, and the third solution further comprises aqueous hydrofluoric acid.

16. The process according to claim 15, wherein the plurality of inert particles comprises polytetrafluoroethylene.

17. The process according to claim 15, wherein the process comprises forming a plurality of particles of $K_2[SiF_6]:Mn^{4+}$, and the plurality of particles has a particle size distribution having a D50 value in a range from about 15 microns to about 25 microns.

18. The process according to claim 15, wherein the source of K comprises potassium hydrogenfluoride ($KHF_2$), potassium fluoride (KF), or a combination thereof.

* * * * *